United States Patent
Kim et al.

(10) Patent No.: US 7,652,232 B2
(45) Date of Patent: Jan. 26, 2010

(54) COFFEE MAKER AND MICROWAVE OVEN AND METHOD FOR CONTROLLING THE SAME

(75) Inventors: Dae Sik Kim, Changwon-si (KR); Man Su Park, Changwon-si (KR); Wan Je Cho, Masan-si (KR); Wang Lim Lee, Busan-si (KR); Jung Ju Kwon, Changwon-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/000,076

(22) Filed: Dec. 1, 2004

(65) Prior Publication Data

US 2005/0115961 A1    Jun. 2, 2005

(30) Foreign Application Priority Data

Dec. 2, 2003    (KR) ............... 10-2003-0086715

(51) Int. Cl.
*H05B 6/80* (2006.01)
*A47J 31/40* (2006.01)

(52) U.S. Cl. ............................ 219/689; 99/280

(58) Field of Classification Search ......... 219/678–689; 99/451, 280
See application file for complete search history.

(56) References Cited

U.S. PATENT DOCUMENTS

| | | | | |
|---|---|---|---|---|
| 4,459,524 A | * | 7/1984 | Oota et al. ............... 318/484 |
| 4,999,466 A | * | 3/1991 | Waligorski ............... 219/689 |
| 5,049,713 A | * | 9/1991 | Creyaufmuller ........... 219/689 |
| 5,095,185 A | * | 3/1992 | Fuchs, Jr. ................. 219/689 |
| 5,300,743 A | * | 4/1994 | Park ........................ 219/689 |
| 5,360,964 A | * | 11/1994 | Park ........................ 219/689 |
| 5,434,392 A | * | 7/1995 | Belinkoff .................. 219/689 |
| 5,491,322 A | * | 2/1996 | Waligorski ............... 219/689 |
| 5,832,809 A | * | 11/1998 | Gras ........................ 99/299 |
| 2005/0115960 A1 | * | 6/2005 | Park et al. ................ 219/679 |
| 2005/0115961 A1 | * | 6/2005 | Kim et al. ................. 219/689 |

FOREIGN PATENT DOCUMENTS

| | | |
|---|---|---|
| EP | 1343356 A2 | 9/2003 |
| JP | 03271630 | 12/1991 |
| KR | 20-1992-5615 | 3/1992 |

* cited by examiner

*Primary Examiner*—Daniel L Robinson
(74) *Attorney, Agent, or Firm*—Birch, Stewart, Kolasch & Birch, LLP

(57) ABSTRACT

Coffee maker and microwave oven, in which a microwave function and a coffee maker function can be performed in succession; and a method for controlling the same. The coffee maker and microwave oven includes a coffee maker unit, a microwave oven unit, an input unit for applying a coffee extraction order for the coffee maker unit and a cooking order for the microwave oven unit, and a control unit for carrying out coffee extraction and cooking in succession according to an order of reception of the orders.

7 Claims, 7 Drawing Sheets

COFFEE MAKER AND MICROWAVE OVEN AND METHOD FOR CONTROLLING THE SAME

CROSS-REFERENCE TO RELATED APPLICATIONS

This application claims the benefit of Korean Application No. P2003-86715 filed on Dec. 2, 2003, which is hereby incorporated by reference as if fully set forth herein.

BACKGROUND OF THE INVENTION

1. Field of the Invention

The present invention relates to coffee maker and microwave ovens, and more particularly, to a coffee maker and microwave oven, in which a microwave function and a coffee maker function can be performed in succession; and a method for controlling the same.

2. Discussion of the Related Art

In general, a microwave oven cooks food with intermolecular frictional heat generated as a high frequency wave (about 2,450 MHz) disturbs molecular arrangement of the food.

Because the microwave oven heats the food with the high frequency wave, the microwave oven cannot cook various kinds of food. For an example, coffee people enjoys to drink, cannot be prepared with the microwave oven, to require a coffee maker, separately.

However, presently, as a city grows the denser, leading to have a small residential space, and according to the trend of pursuing practicality, the various necessaries of life, starting from home appliances, are required to be compact, such that the home appliances are required to have, not only the traditional original functions, but also various extra functions.

However, the related art microwave oven can not meet such consumer demands.

SUMMARY OF THE INVENTION

Accordingly, the present invention is directed to a coffee maker and microwave oven and a method for controlling the same that substantially obviates one or more problems due to limitations and disadvantages of the related art.

An object of the present invention is to provide a coffee maker and microwave oven and a method for controlling the same which can perform a microwave oven function and a coffee maker function in succession.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a coffee maker and microwave oven includes a coffee maker unit, a microwave oven unit, an input unit for applying a coffee extraction order for the coffee maker unit and a cooking order for the microwave oven unit, and a control unit for carrying out coffee extraction and cooking in succession according to an order of reception of the orders.

Preferably, the input unit includes a first panel having keys for applying the cooking order for the microwave oven unit, and a second panel having keys for applying the coffee extraction order for the coffee maker unit.

Preferably, the input unit further includes a control key for controlling the microwave oven unit and the coffee maker unit in succession.

Preferably, the control key informs successive reception of the cooking order and the coffee extraction order to the control unit.

Preferably, the orders are applied to the first panel and the second panel respectively after the control key is pressed.

Preferably, the input unit further includes an enter key for informing on completion of application of the orders to the control unit.

Preferably, the coffee maker and microwave oven further includes a memory for storing the orders applied to the input unit therein.

Preferably, the input unit is provided on a front of the coffee maker and microwave oven.

In another aspect of the present invention, a method for controlling a coffee maker and microwave oven having a coffee maker unit, and a microwave unit, includes a first step for determining reception both of a coffee extraction order for the coffee maker unit, and a cooking order for the microwave oven unit, a second step for storing the orders according to an order of reception of the orders if the order are received, and a third step for carrying out the stored orders according to an order of storage.

Preferably, the first step includes the step of carrying out only one order, if only one order is received out of orders.

Preferably, the method further includes the step of determining user's completion of application of the orders after the second step.

Preferably, the method further includes the step of carrying out the third step when user's application of orders is completed, and terminating operation when user's application of orders is not completed.

Preferably, the method further includes the step of application of a preliminary order for the cooking order and the coffee extraction order before the first step.

Preferably, the method further includes the step of carrying out the first step when the preliminary order is received, and carrying out a received order if one of the cooking order or the coffee extraction order is received, without reception of the preliminary order.

In the meantime, in another aspect of the present invention, a method for controlling a coffee maker and microwave oven having a coffee maker unit, and a microwave unit, includes a first step for receiving one of a coffee extraction order for the coffee maker unit, and a cooking order for the microwave oven unit, a second step for storing the order, a third step for determining user's completion of application of order, or user's additional application of order, and a fourth step for carrying out the stored orders when the user's application of orders is completed.

Preferably, the method further includes the step of repeating the first step when there is user's additional application of orders.

Preferably, the second step includes the step of storing the received orders according to an order of reception of the order.

Preferably, the fourth step includes the step of carrying out the stored orders according to an order of storage.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
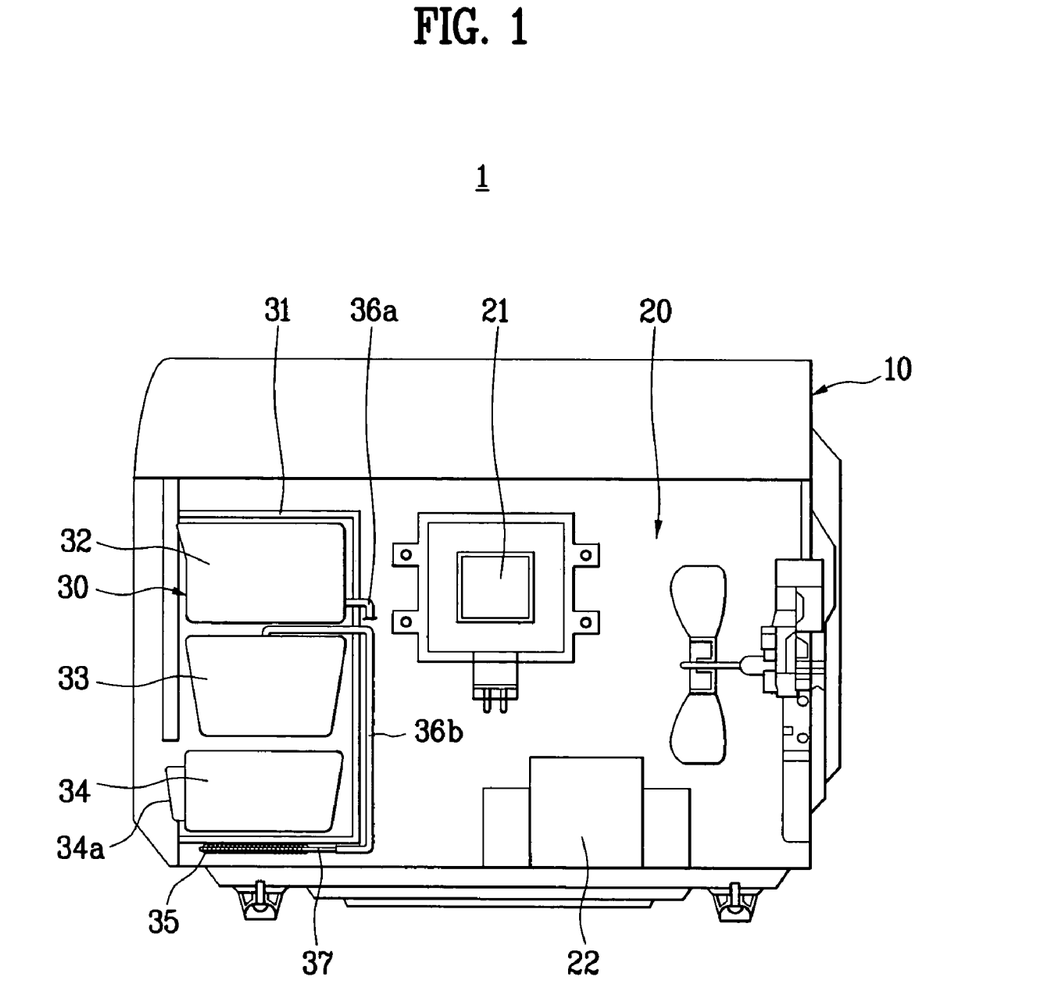
FIG. 1 illustrates a section of a coffee maker and microwave oven in accordance with a first preferred embodiment of the present invention.
Figure 2:
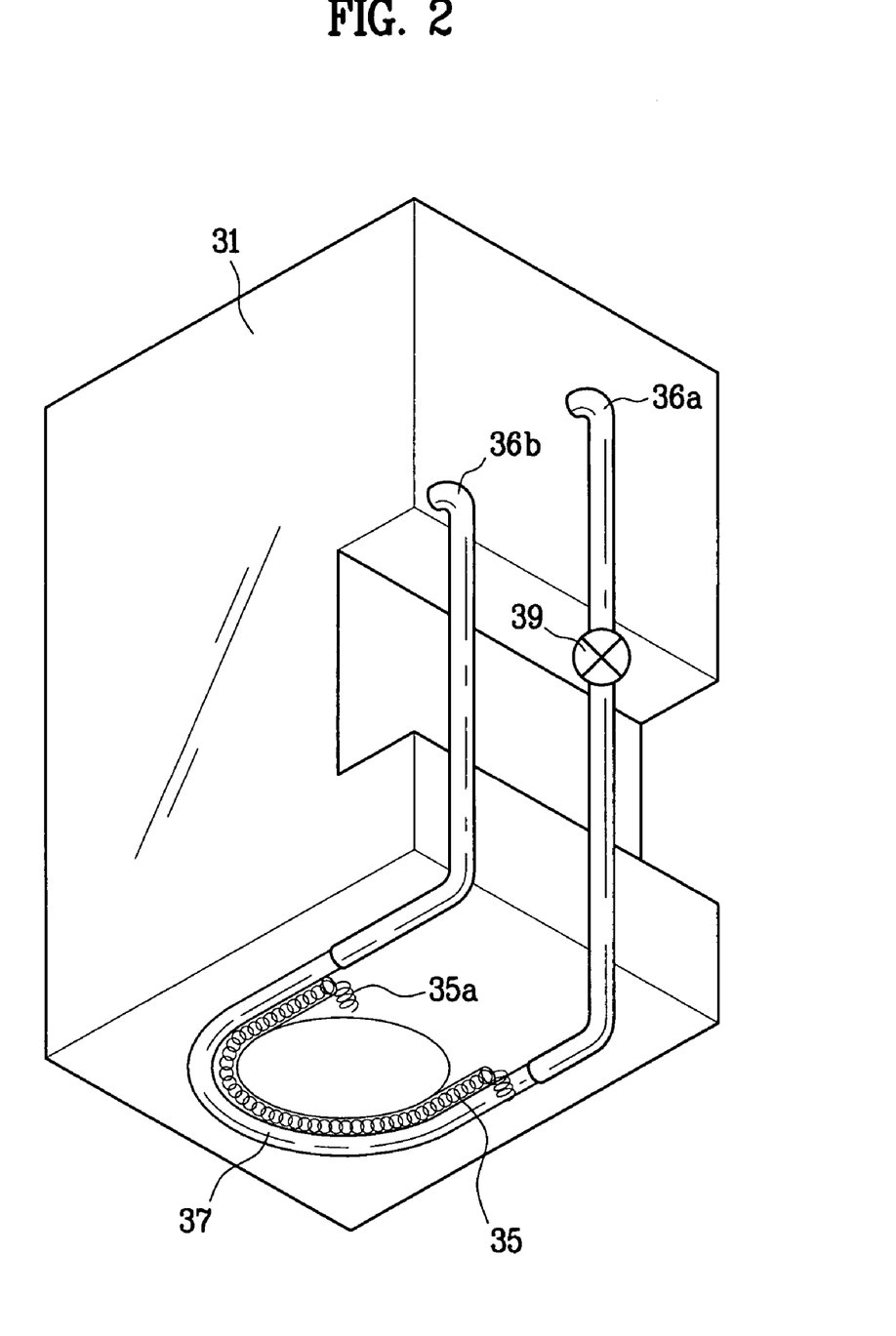
FIG. 2 illustrates a perspective view of a coffee maker unit in the coffee maker and microwave oven in accordance with a first preferred embodiment of the present invention.

FIG. 1 illustrates a section of a coffee maker and microwave oven in accordance with a first preferred embodiment of the present invention, and FIG. 2 illustrates a bottom perspective view of a coffee maker unit in the coffee maker and microwave oven in FIG. 1.

Referring to FIGS. 1 and 2, the coffee maker and microwave oven includes a cabinet 10 forming an exterior, an outfit room 20 in the cabinet 10, and a coffee maker unit 30 at one side of the outfit room 20.

In the outfit room 20, there are various electric parts, such as a magnetron 21, and a high voltage transformer 22. The magnetron 21 receives an external high voltage power, and generates a microwave, and the high voltage transformer 22 transforms external power to high voltage power, before application to the magnetron 21. The magnetron 21 makes water molecules in food to vibrate, for cooking of food.

The coffee maker unit 30 includes a case 31 at one side of the outfit room 20, a water tank 32, a funnel 33, water supply pipes 36a, and 36b, a water tube 37, a heater tube 35, and a water supply valve 39.

The case 31 forms an exterior of the coffee maker unit 30, and the water tank 32 at an upper portion of the case 21 for storing potable water. The funnel 33 under the water tank 32 has a filter (not shown) for extracting coffee.

In more detail, the funnel 33 has a shape of a cone having a great upper inside diameter, and a small lower inside diameter. On an inside of the funnel 33, there is a filter (not shown) of paper of non-woven fabric placed on an inside, on which coffee powder is filled.

Therefore, when hot potable water is supplied to the funnel 33, the coffee powder is dissolved in the water, and coffee solution passes through the filter and drops downward. For this, under the funnel 34, there is a drop hole (not shown) in a bottom of the funnel 34 for enabling the coffee solution to drop downward.

In the meantime, under the funnel 33, there is a jug 34 as a container for storing coffee. The jug 34 has an opened top with a hand grip 34a at one side.

Accordingly, by gripping the hand grip 34a, the user can put the jug 34 inside of the case 31, or take the jug 34 out of the case 31, easily. In general, the jug 34 is formed of transparent glass or plastic for the user to see a level of the coffee in the jug.

The water supply pipes 36a, and 36b supply the potable water from the water tank 32 to the funnel 33. The water supply pipes 36a, and 36b have a first pipe 36a connected to the water tank 32, and a second pipe 36b for supplying potable water to the funnel 33, directly.

The water supply tube 37 is mounted on a bottom of the case 31, and has one end connected to the first pipe 36a, and the other end connected to the second pipe 36b . Therefore, the potable water in the water tank 32 is supplied to the funnel 33 through the first pipe 36a, the water supply tube 37, and the second pipe 36b.

The heater tube 35 is in contact with the water supply tube 37, and has a heater 35a provided therein. Upon putting the coffee maker unit 30 into operation, the heater 35a generates heat at a high temperature, to heat the potable water passing through the water supply tube 37.

According to this, the potable water guided to the water supply tube 37 through the first pipe 36a is heated by the heater 35a and supplied to the funnel 33 via the second pipe 36b.

It is preferable that the water supply tube 37 is formed of a material having a good heat conductivity for smooth conduction of heat from the heater 35a. In detail, it is preferable that the water supply tube 37 is formed of ceramic.

Moreover, the heater 35a also heats the jug 34 placed on the bottom of the case 31. Therefore, the coffee in the jug 34 always maintains a warm state by the heat from the heater 35a.

In this instance, it is a prerequisite that the coffee maker unit and the microwave oven unit are not in operation at the same time due to problems of allowable power, and so on.

In the meantime, in the foregoing coffee maker and microwave oven, embodiments for controlling the coffee maker and microwave oven will be described with reference to the attached drawings.

Figure 3:
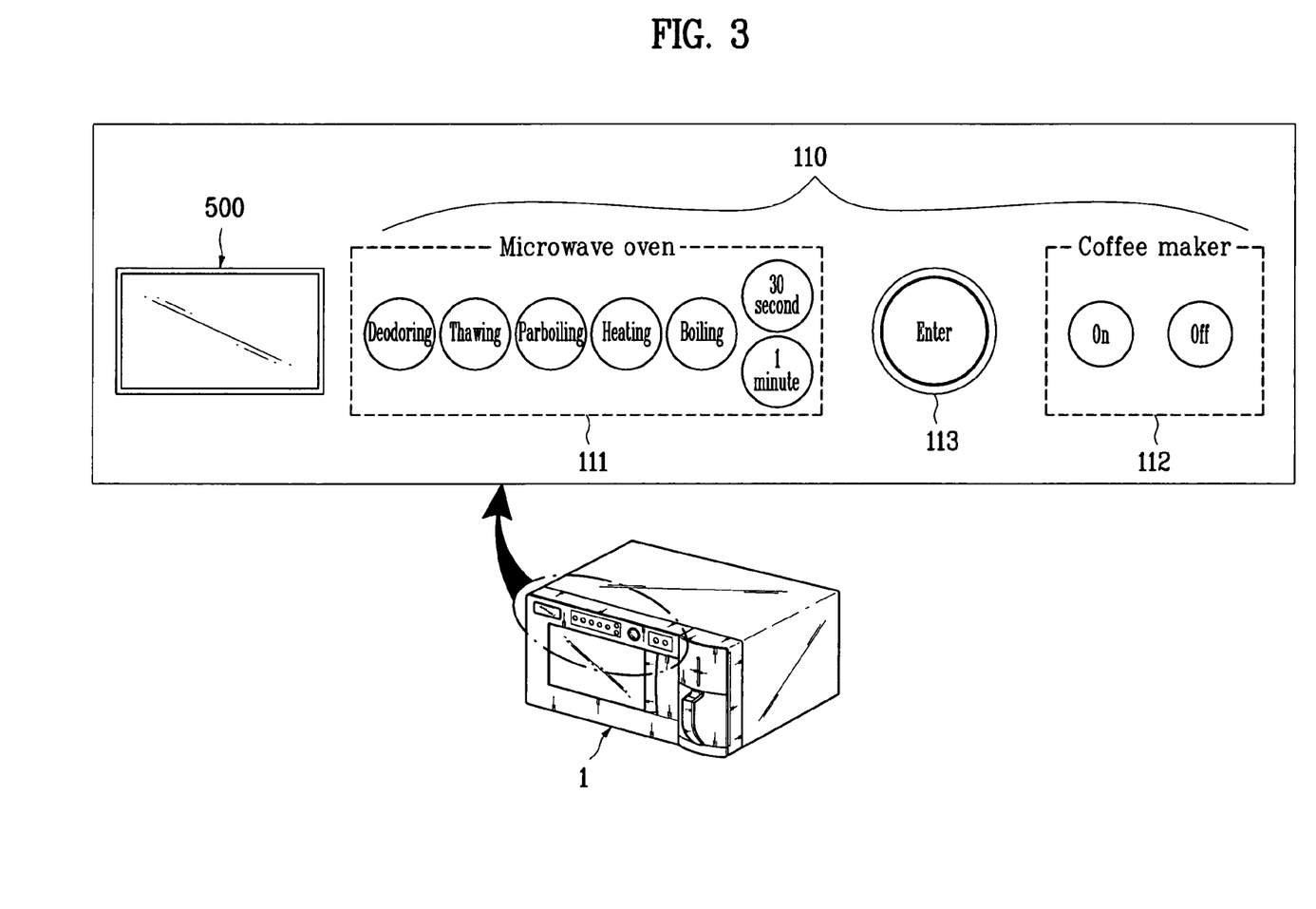
FIG. 3 illustrates a front view of an input unit in a coffee maker and microwave oven in accordance with a second preferred embodiment of the present invention.
Figure 4:
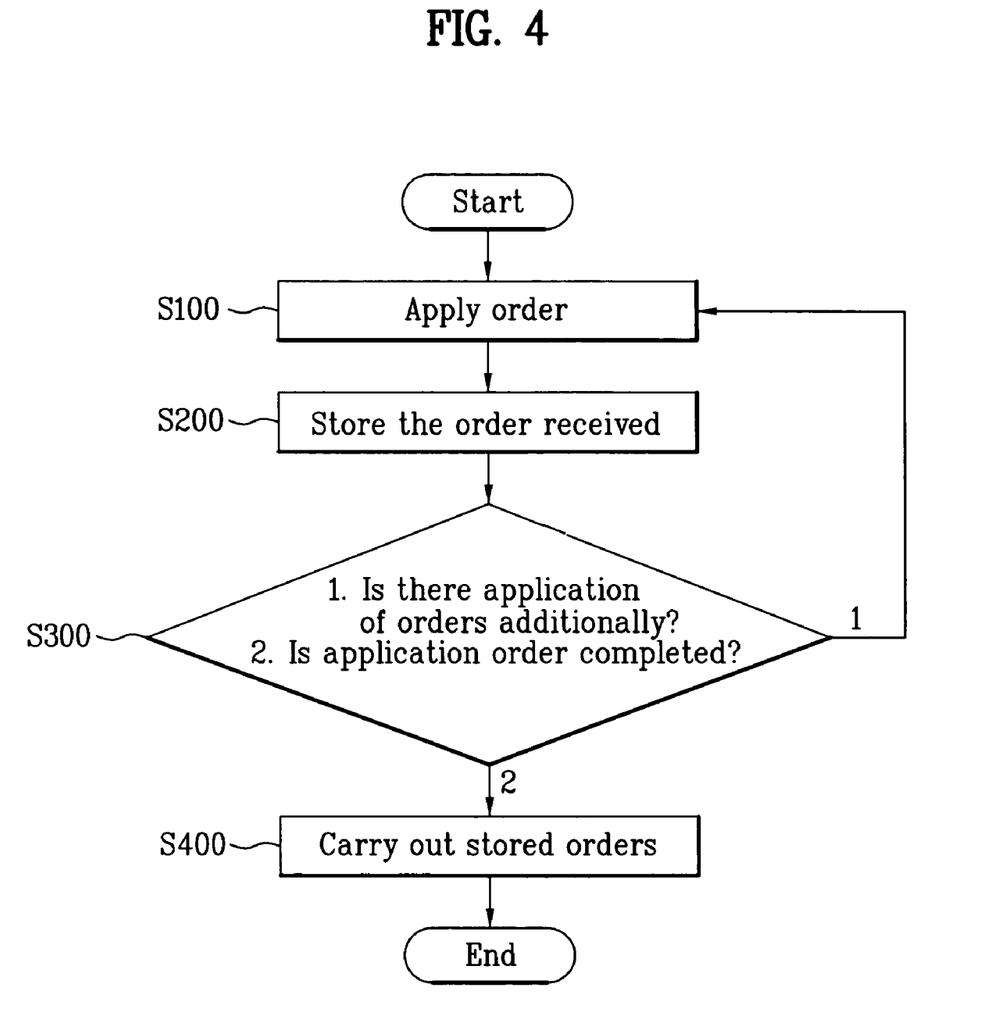
FIG. 4 illustrates a flow chart showing the steps of a method for controlling a coffee maker and microwave oven in accordance with a second preferred embodiment of the present invention.
Figure 5:
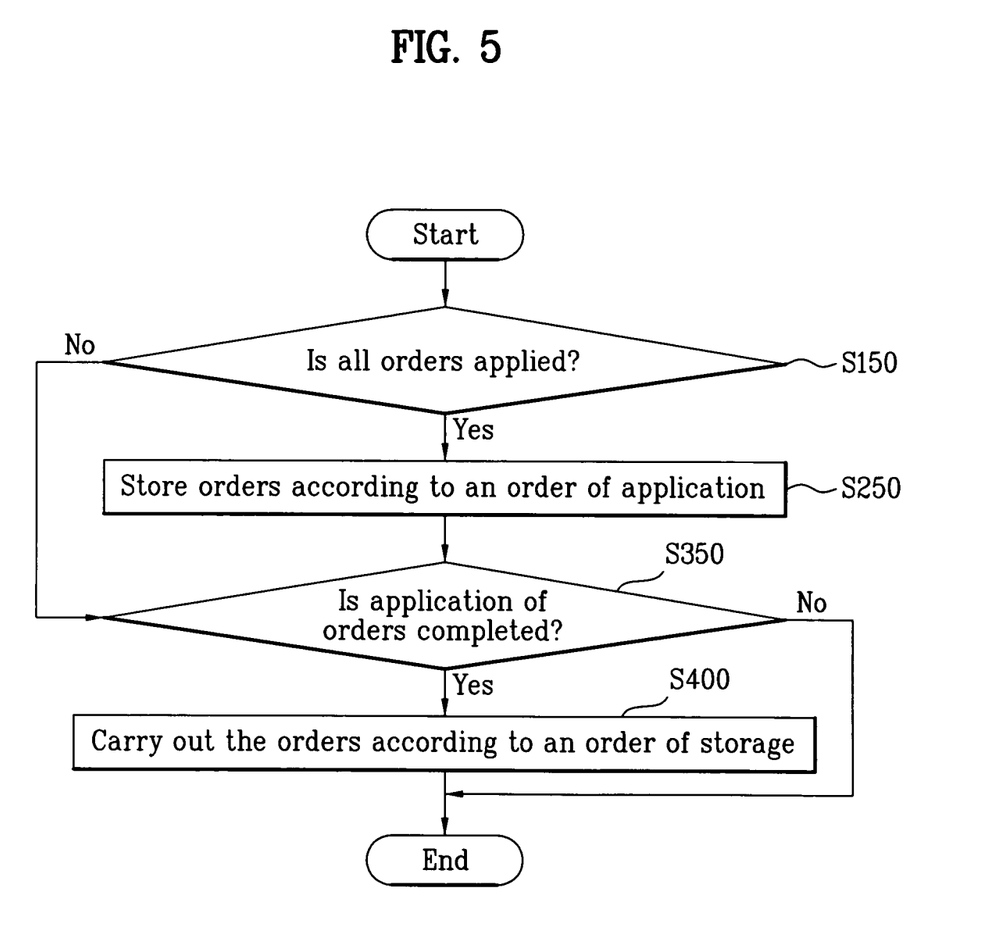
FIG. 5 illustrates a flow chart showing the steps of another method for controlling a coffee maker and microwave oven in accordance with a second preferred embodiment of the present invention.

FIGS. 3, 4, and 5 illustrate a coffee maker and microwave oven and a method for controlling the same in accordance with a second preferred embodiment of the present invention.

The coffee maker and microwave oven 100 includes an input unit 110 for applying an order, and a control unit 120 (not shown) for carrying out the order. The coffee maker and microwave oven 100 further includes a memory (not shown) for storing the order applied thereto. The coffee maker and microwave oven 100 further includes a display unit 500 for the user to know states, such as a remained cooking time period, and so on.

The input unit 110 is designed to apply a coffee extraction order to the coffee maker unit, and a cooking order to the microwave oven unit. For easy access, the input unit 110 is on a front surface of the coffee maker and microwave oven.

The input unit 110 includes a first panel 111, and a second panel 112, each having various keys.

In more detail, the first panel 111 is provided with keys for applying the cooking order to the microwave oven unit. The user applies the cooking order to the microwave oven to the control unit 120 through the keys on the first panel 111. The keys on the first panel 111 have orders given thereto according to cooking conditions in advance, for the user to press the keys on the first panel 111, to cook the food as the user desires.

The second panel 112 has keys for applying the coffee extracting order to the coffee maker unit. The user applies the coffee extracting order for the coffee maker unit to the control unit 120 through the keys on the second panel 112. The keys on the second panel 112 have the coffee extraction order given thereto in advance, and orders for selecting kinds of coffee may be given thereto in advance. By pressing the key on the second panel 112, the user can apply an order to extract a kind of coffee the user desires.

In the meantime, the input unit 110 further includes an enter key 113. The enter key 113 informs completion of application of orders to the control unit 120. The enter key 113 is a key the user orders the control unit 120 to carry out applied orders.

In more detail, upon completion of application of orders, the user presses the enter key 113. Then, the enter key 113 issues a signal, and the control unit 120 detects the signal, determines that application of order is completed, and carries out the orders.

That is, the coffee maker and microwave oven 100 is not put into operation until the user presses the enter key 113 after the user applies orders through the first panel 111 or the second panel 112.

In the meantime, the control unit 120 is provided to one side of the coffee maker and microwave oven 100. The control unit 120 carries out applied order thus, and provides food or coffee in a state the user desires. The control unit 120 controls the magnetron 21, and the high voltage transformer 22, and so on, to carry out the cooking order, or the water supply valve 39, and so on, to carry out the coffee extraction order.

In this instance, if the user applies the cooking order, or the coffee extraction order, the control unit 120 carries out the order the user applies, and provides cooked food or coffee. If the user applies both orders, the control unit 120 carries out the coffee extraction and the cooking in succession according to an order of application of the orders.

In the meantime, a method for controlling a coffee maker and microwave oven 100 in accordance with a second preferred embodiment of the present invention will be described with reference to FIG. 4.

One of a coffee extraction order for a coffee maker unit and a cooking order for a microwave oven unit is applied to a control unit 120 through an input unit 110 (S100). Then, the control unit 120 receives, and stores the order in a memory (not shown) therein (S200).

Then, the control unit 120 determines whether the user finishes application of order, or has additional order to apply (S300). In more detail, the control unit 120 determines that the user has additional order to apply when an order has applied to the first panel 111 or the second panel 112 of the input unit 110. The control unit 120 determines that application of order from the user is finished when an order is applied through the enter key 113.

Upon completion of application of the order, the control unit 120 carries out the stored orders (S400).

On the other hand, if there is an additional order received at the control unit, the first step is repeated.

When the first step is repeated, the control unit 120 stores the order applied thereto repetition next to the order applied at first. That is, the control unit 120 stores the orders in an order of application. In the fourth step, the control unit 120 carries out the stored orders in an order of storage.

The control method will be described, taking an example.

The user applies the coffee extraction order to the input unit 110. Then, the control unit 120 detects the coffee extraction order, and stores the coffee extraction order in the memory (not shown).

Then, the control unit 120 determines whether the user finishes application of order, or has an additional order to apply. If the user finishes application of order, the control unit 120 carries out the coffee extraction order.

However, if the user does not finish application of order, but applies a cooking order additionally, the control unit 120 detects the cooking order, and stores the cooking order in the memory (not shown). In this instance, the control unit 120 stores the cooking order next to the coffee extraction order stored already.

Then, the control unit 120 determines whether the user finishes application of order, or has an additional order to apply. If the user finishes application of order, the control unit 120 carries out the coffee extraction order at first, and the cooking order according to the order of storage.

In the meantime, FIG. 5 illustrates a flow chart showing the steps of another method for controlling a coffee maker and microwave oven in accordance with a second preferred embodiment of the present invention. The another method for controlling a coffee maker and microwave oven 100 in accordance with a second preferred embodiment of the present invention will be described with reference to FIG. 5.

The control unit 120 determines whether both a coffee extraction order for a coffee maker unit and a cooking order for a microwave oven are applied or not (S150).

If applied, the control unit 120 stores the order in a memory (not shown) according to an order of application (S250). Then, the control unit 120 carries out the stored orders according to an order of storage (S400).

In the meantime, after the S250, the control unit 120 detects whether a signal is issued from the enter key 113, or not. When the enter key 113 issues the signal, the control unit 120 carries out the S400. However, if the enter key 113 does not issue the signal, the control unit 120 terminates working (S350).

If only one order is applied in the S150, the control unit 120 does not store the order, but carries out the order. In this instance, the control unit 120 carries out the order when the signal is issued from the enter key 113. That is, the control unit 120 carries out the one order applied thereto, when the user finishes application of the order.

Figure 6:
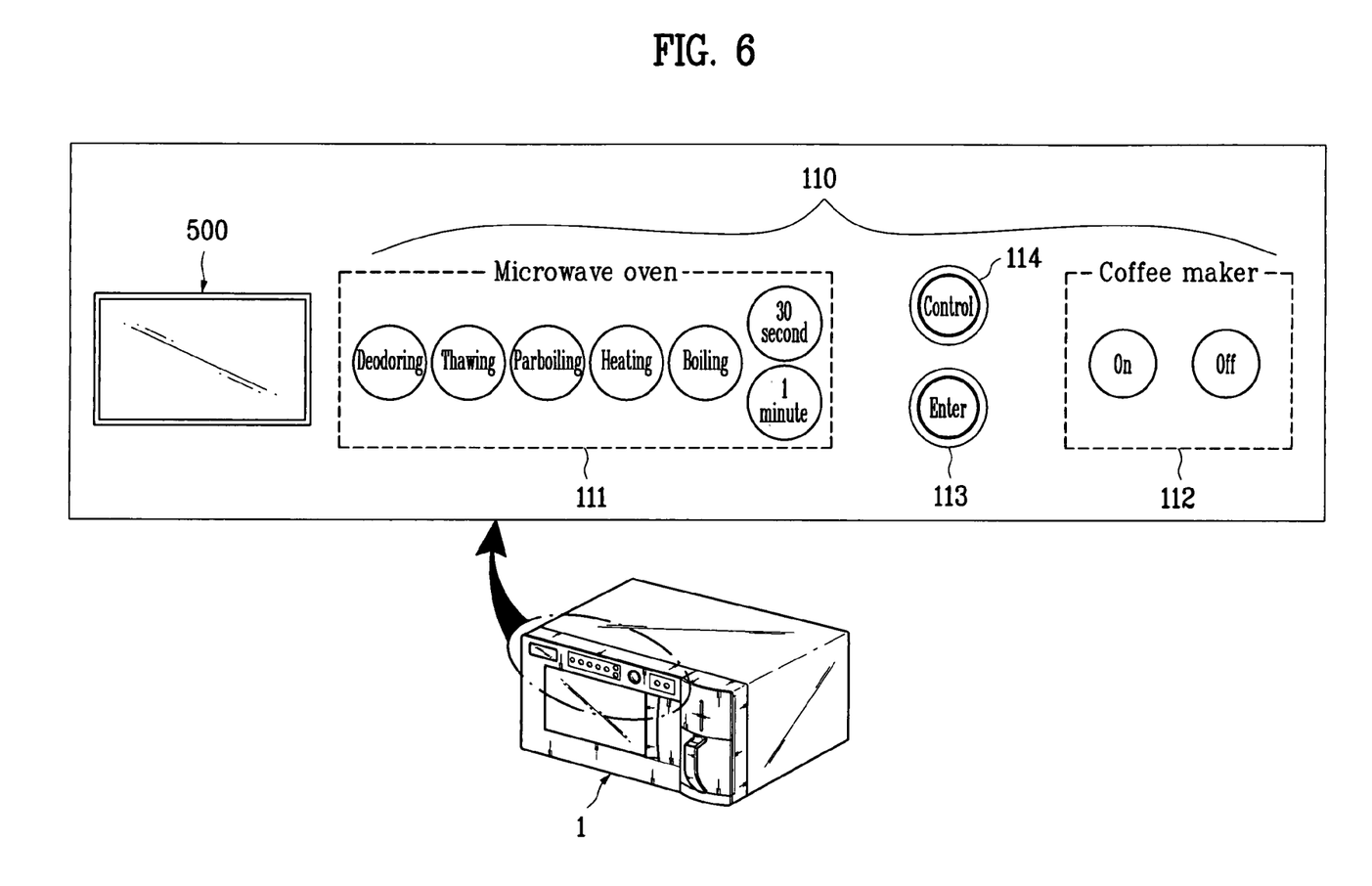
FIG. 6 illustrates a front view of an input unit in a coffee maker and microwave oven in accordance with a third preferred embodiment of the present invention.
Figure 7:
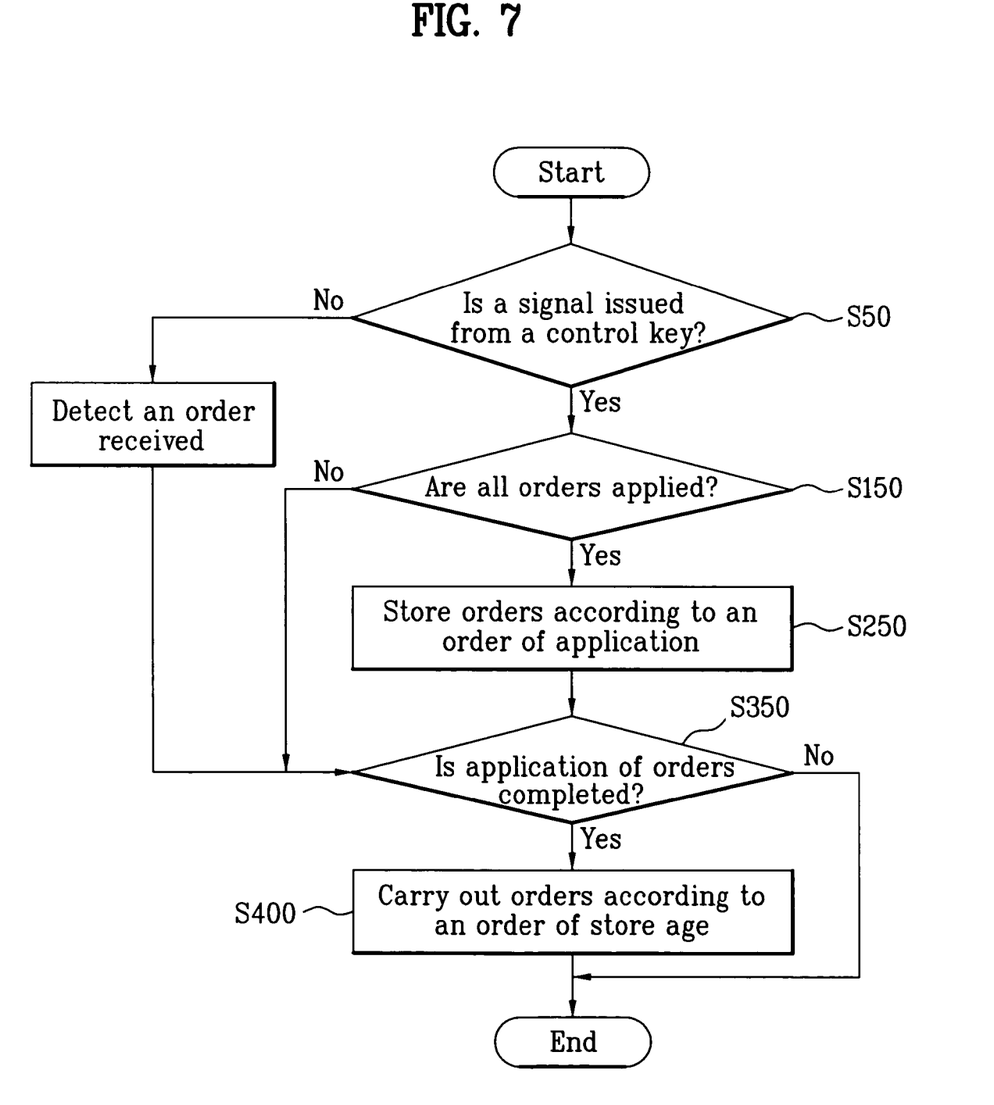
FIG. 7 illustrates a flow chart showing the steps of a method for controlling a coffee maker and microwave oven in accordance with a second preferred embodiment of the present invention.

A coffee maker and microwave oven and a method for controlling the same in accordance with a third preferred embodiment of the present invention will be described, with reference to FIGS. 6 and 7.

The coffee maker and microwave oven in accordance with a third preferred embodiment of the present invention includes an input unit 110, and a control unit 120. The input unit 110 includes a first panel 111, and a second panel 112. The input unit 110 further includes an enter key 113.

The first panel 111, the second panel 112, the enter key, and the control unit 120 have functions the same with the description given in the second embodiment, and detailed description of which will be omitted, for avoiding repetition.

In the meantime, the input unit 110 further includes a control key 114. The control key 114 has a function for applying a preliminary order. The preliminary order is a function for informing successive application of a cooking order and a coffee extraction order to the control unit 120. Therefore, for successive application of a cooking order and a coffee extraction order, after pressing the control key 114, the user applies the order to the first panel 111 and the second panel 112.

A method for controlling a coffee maker and microwave oven 100 in accordance with a third preferred embodiment of the present invention will be described, with reference to FIG. 7.

The control unit 120 detects whether the control key 114 issues a signal, or not. That is, the control unit determines whether the user applies the preliminary order or not. Upon detecting the signal from the control key 114, the control unit 120 determines that both the cooking order and the coffee extraction order are received, and carries out the next step (S50).

The control unit 120 determines whether both the coffee extraction order for the coffee maker and the cooking order for the microwave oven are received or not (S150).

If received, the control unit 120 stores the orders in a memory (not shown) according to an order of reception (S250).

Then, the control unit 120 carries out the stored orders according to an order of storage (S400).

In the meantime, after S250, the control unit 120 detects whether the enter key 113 issues a signal or not. If the enter key 113 have issued the signal, the control unit 120 carries out S400. However, if the enter key 113 does not issue the signal, the control unit 120 terminates working (S350).

If only one order is received in S150, the control unit 120 does not store the order, but carries out the order when the signal is issued from the enter key 113. That is, when the user finishes application of an order, the control unit 120 carries out the order received.

In the meantime, if order are received without the control key 114 is not pressed in the step S50, the control unit 120 detects the order. Then, when the enter key 113 issues the signal, the control unit 120 carries out the order. That is, when the user finishes application of an order, the control unit 120 carries out the order received.

Though not shown, in a case two orders are received without the control key 114 being pressed, of the order, the control unit 120 carries out the order received at first.

As has been described, the coffee maker and microwave oven, and a method for controlling the same of the present invention is convenient to use because a cooking order for the microwave oven unit and a coffee extraction order for the coffee maker unit can be carried in succession.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A coffee maker and microwave oven comprising:
   a coffee maker unit;
   a microwave oven unit;
   an input unit for applying a coffee extraction order for the coffee maker unit and a cooking order for the microwave oven unit, the cooking order being different from the coffee extraction order; and
   a control unit for carrying out the coffee extraction order and the cooking order in succession according to an order of reception of the orders,
   wherein the input unit includes;
   a first panel having keys for applying the cooking order for the microwave oven unit, and
   a second panel having keys for applying the coffee extraction order for the coffee maker unit.

2. The coffee maker and microwave oven as claimed in claim 1, wherein the input unit further includes a control key for controlling the microwave oven unit and the coffee maker unit in succession.

3. The coffee maker and microwave oven as claimed in claim 2, wherein the control key informs successive reception of the cooking order and the coffee extraction order to the control unit.

4. The coffee maker and microwave oven as claimed in claim 3, wherein the orders are applied to the first panel and the second panel respectively after the control key is pressed.

5. The coffee maker and microwave oven as claimed in claim 1, wherein the input unit further includes an enter key for informing on completion of application of the orders to the control unit.

6. A coffee maker and microwave oven comprising:
   a coffee maker unit;
   a microwave oven unit;
   an input unit for applying a coffee extraction order for the coffee maker unit and a cooking order for the microwave oven unit, the cooking order being different fro the coffee extraction order;
   a control unit for carrying out the coffee extraction order and the cooking order in succession according to an order of reception of the orders; and
   a memory for storing the orders applied to the input unit therein.

7. A coffee maker and microwave oven comprising:
   a coffee maker unit;
   a microwave oven unit;
   an input unit for applying a coffee extraction order for the coffee maker unit and a cooking order for the microwave oven unit, the cooking order being different from the coffee extraction order; and
   a control unit for carrying out the coffee extraction order and the cooking order in succession according to an order of reception of the orders,
   wherein the control unit carries out the coffee extraction order and the cooking order in succession after both the coffee extraction order and the cooking order are applied.

* * * * *